Oct. 19, 1948.   R. J. KIRKBY   2,451,559
VALVE MECHANISM FOR HANDLING
LIQUIFIED GASES AND THE LIKE
Filed March 6, 1945   3 Sheets-Sheet 1

Raymond J. Kirkby Inventor
By R. S. Berry
Attorney

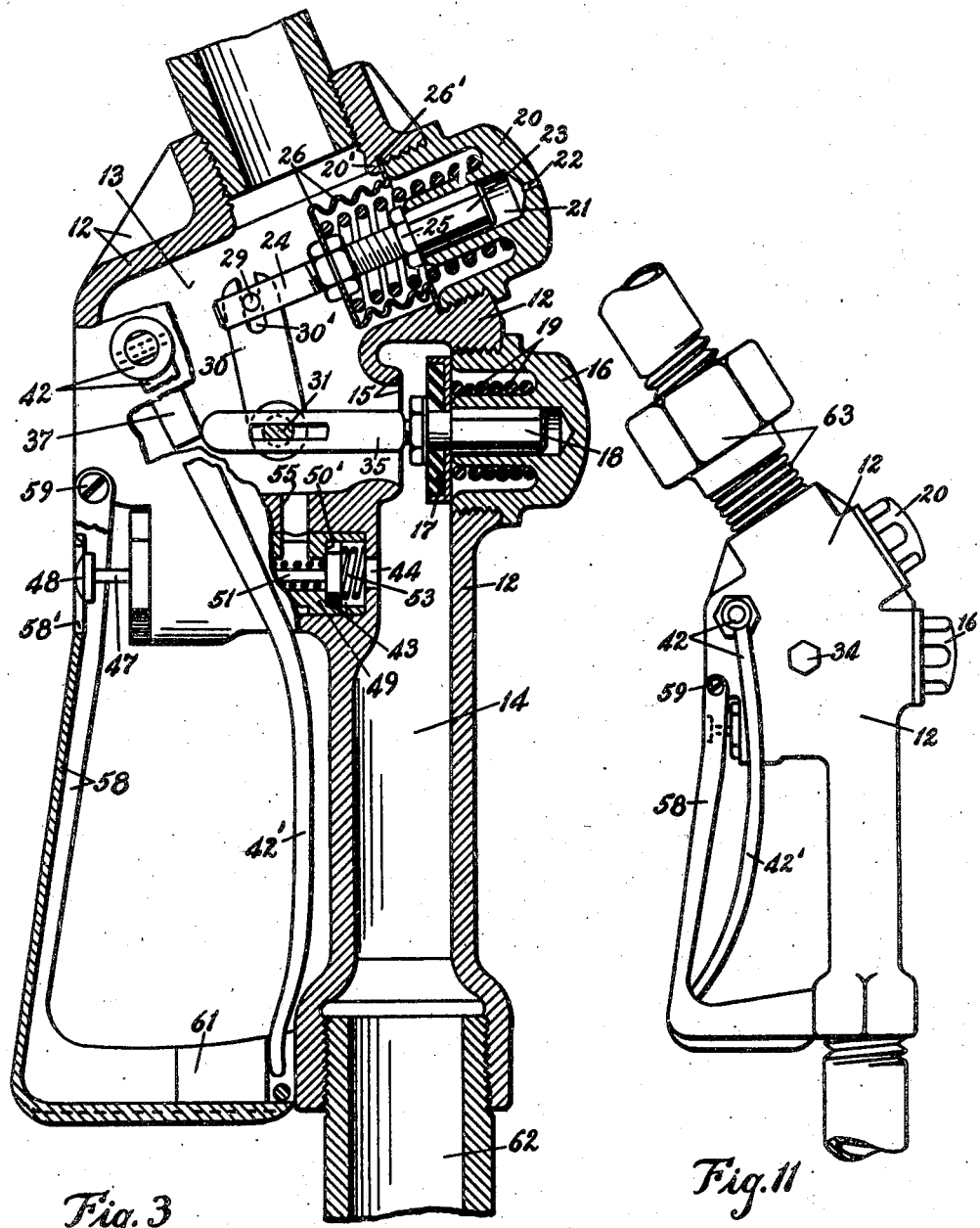

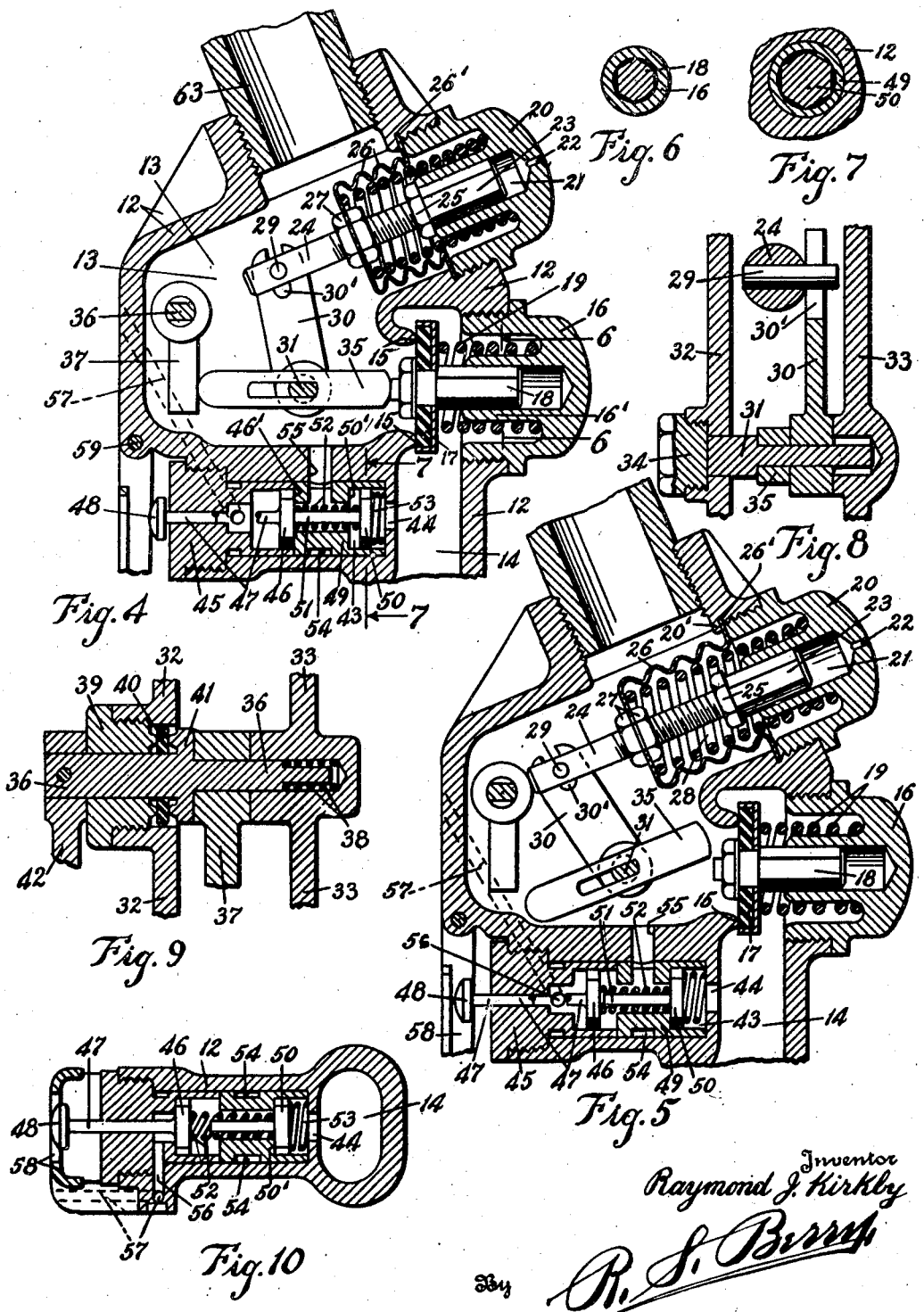

Patented Oct. 19, 1948

2,451,559

UNITED STATES PATENT OFFICE 2,451,559

VALVE MECHANISM FOR HANDLING LIQUEFIED GASES AND THE LIKE

Raymond J. Kirkby, Sherman Oaks, Calif., assignor to Adel Precision Products Corp., a corporation of California Application March 6, 1945, Serial No. 581,319

10 Claims. (Cl. 277—53)

This invention relates to valve mechanisms for handling liquified gases, and the like, such as have to be handled and transferred from one place to another under closed conditions, and under pressure, and in order to prevent waste thereof by escape into the atmosphere, as well as possible danger.

While the invention has many possible uses where liquids or gases, or liquified gases, are to be transferred under pressure from one place to another, I have chosen for the purpose of explanation, and as one practical application or embodiment of the invention, to illustrate it as a dispensing or transfer valve mechanism.

Among the salient objects of this invention are: to provide a construction and arrangement of valve mechanism which will make possible the safe flow of fluid gas under pressure from one place to another, under closed conditions, and under full control at all times; to provide a mechanism of the character referred to in which a body, adapted to be connected with a source of supply of liquid gas under pressure and with a closed receptacle therefor, is divided into a receiving chamber and an exit chamber with valve member therein for opening communication therebetween; to provide means in connection therewith, movable into position for moving said valve member off its valve seat to open communication between said chambers before it is operated; to provide a valve-moving member, with means operable by increased pressure within the chamber for moving said member into operative position, with a lever manually operable for moving said member and said valve member to open position; to provide in such a mechanism a main valve member which is held closed by a spring and by the pressure of the liquid or gas being handled; to provide in connection therewith a closed by-pass, with means for opening the same, for equalizing the pressure on both sides of said main valve member; to provide in combination with a pressure closed valve member, spring means for holding said valve member closed when the gas pressure on opposite sides thereof has been equalized, whereby said valve member can be more easily moved to open position; and, in general, to provide a transfer valve mechanism for handling such gases and fluids, which is simple in construction, practical and reliable in operation, and which is light in weight and convenient for manual handling and operation.

In order to describe my invention, I have illustrated it on the accompanying three sheets of drawings, in which:

Fig. 3 is a similar view showing the parts in open or operative positions;

Figs. 4 and 5 are similar views, in fragment, and showing the parts in slightly different positions;

Figure 2:
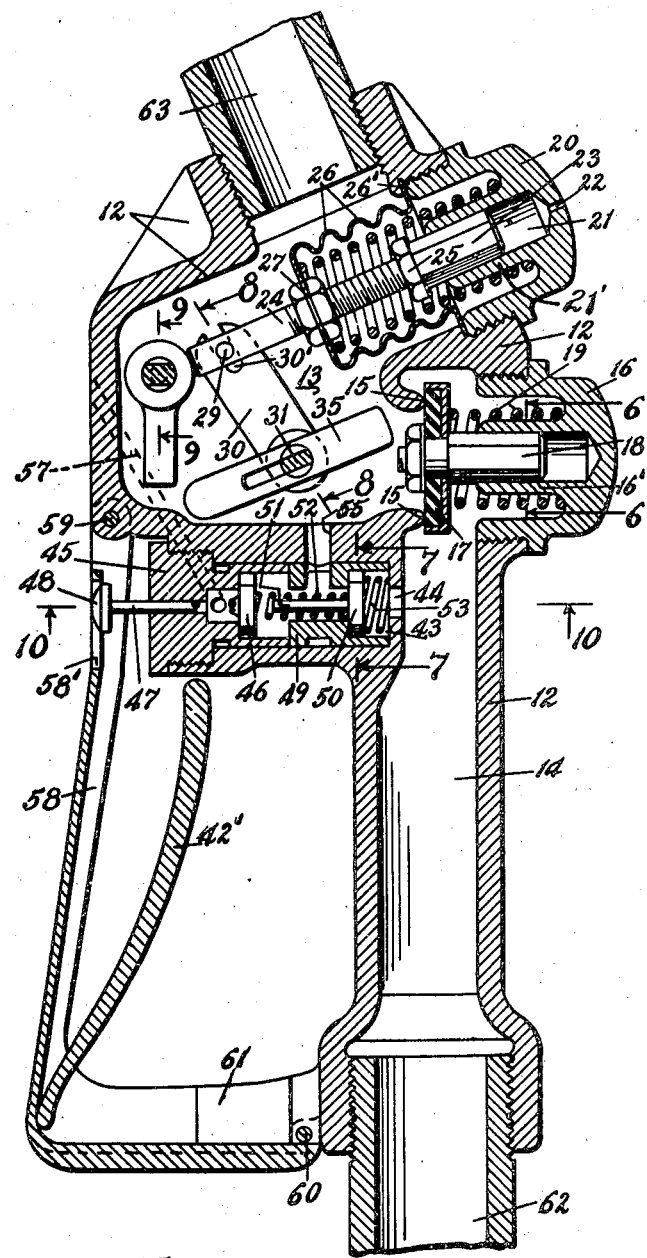
Fig. 2 is a vertical sectional view thereof taken on the line 2—2 of Fig. 1, showing the parts in closed or inoperative positions.

Figs. 6, 7, 8, 9 and 10 are cross sectional views taken, respectively, on the lines 6—6, 7—7, 8—8, 9—9, and 10—10 of Fig. 2; and Fig. 11 is a side elevation of a dispensing valve of the character referred to with its connections indicated.

Figure 1:
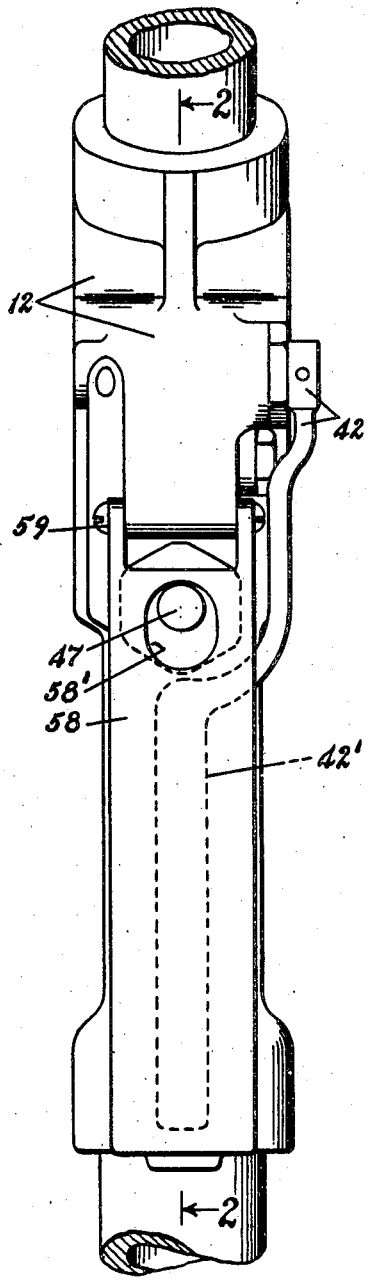
Fig. 1 is a front elevation of a dispensing or transfer valve mechanism embodying my invention.

Referring now in detail to the embodiment of my invention here illustrated, a valve body 12 is shown in side elevation in Fig. 11, and in edge elevation in Fig. 1, and in which there is an exit chamber 13 and an entrance chamber 14, with an annular valve seat 15 therebetween, as shown in Fig. 2. A screw plug 16 is threaded into the body of said mechanism, opposite said annular valve seat 15, and carries a main valve member 17, of rubber, fiber or other suitable material, and supported on a hexagonal valve stem 18, slidable in a central bore in said screw plug, and normally held closed by a coiled spring 19, around the central core 16' of said screw plug 16 and bearing against said valve member 17, all in the manner clearly illustrated in Figs. 2, 3, 4 and 5. It will be noted that by the removal of said screw plug 16, said valve is bodily removable for repair and said valve seat is accessible.

A second screw plug 20 is also threaded into said body, with a similar central bore 21, but with a breather opening 22, and in this bore is slidably mounted the hexagonal end 23, of a plunger rod 24, threaded to receive said hexagonal end and a stop nut 25, adjustable thereon, as will be clear from the showing in said drawing. A metallic bellows 26 has its closed end secured on said plunger rod 24 and held in place by two lock nuts 27, 27, while the open end of said bellows is provided with a flange 26' clamped between the inner end of said screw plug 20 and an annular shoulder 20', as shown. A coiled spring 28, in said metallic bellows, bears outwardly against the inner end thereof and at its other end, said spring is anchored in said screw plug 20, around the central core 21' thereof, whereby to normally extend said bellows, as shown in Fig. 2.

The inner end of said plunger rod 24 is operatively connected by means of a pin 29, with an arm or lever 30, having an open slot 30' in its end to receive said pin, said arm or lever being mounted at its other end on a rocker shaft 31, having its opposite ends in suitable bearings in the opposite walls of said body, designated 32 and 33 in the sectional view thereof shown in Fig. 8.

Said rocker shaft 31 is held in place by means of a screw plug 34 in any suitable manner. Slidably mounted on a flattened portion of said rocker shaft 31, is a slotted valve-moving member 35, capable of being moved endwise on said rocker shaft in a manner hereinafter again referred to.

Also mounted through said body, in walls 32 and 33, is a second rocker shaft 36, on which is a depending arm 37, adapted to be moved to engage said member 35, as indicated in Figs. 3 and 4. Said rocker shaft 36, in the wall 33, is reduced in diameter and provided with a coiled spring 38, as seen in Fig. 9, and at its other end, said rocker shaft is provided with a confining screw plug 39, with a gasket 40, adapted to be clamped between its inner end and a cooperating member 41, as shown in said Fig. 9. Mounted on the outer end of said rocker shaft 36 is an operating lever 42, the lower end of which is extended, as at 42' for manual operation, said lever being seen clearly in the edge view Fig. 1.

Formed in said body is a cylindrical chamber 43, opening at its inner end, as at 44, into the entrance chamber 14, and at its outer end said chamber is provided with a screw plug 45, carrying at its inner end a cylindrical chamber, with a hexagonal valve 46 movable therein by means of a push rod 47, provided with a head 48 on its outer end as shown. A second valve cage or cylindrical member 49 is fitted in the inner end of said cylindrical chamber 43, with its end enlarged to receive a hexagonal valve member 50, having an operating rod 51 extended inwardly therefrom, and provided with a coiled spring 52 thereon. Said coiled spring bears against both of said hexagonal valves 46 and 50, normally moving them in opposite directions. A heavier coiled spring 53 is placed in the innermost end of said valve cage 49 to normally hold said valve 50 closed on its valve seat 50'. Said valve cage 49 is provided intermediate its ends with an exterior annular channel 54, in communication with a port 55 into the exit chamber 13, as seen in Fig. 2. Leading from the central opening in the screw plug 45, behind the push valve 46, is a lateral port 56 leading to and communicating with a vent port 57, extending upwardly in an angular position through the body 1, and indicated in light broken lines in Figs. 2 and 4.

The mechanism just described provides a closed by-pass for fluid pressure around said main valve in order to equalize the pressure on opposite sides of said main valve member when desired.

It will be understood that the purpose of using hexagonal or angular edged valves 46 and 50 is to permit leakage of gas pressure around said valves when they are unseated from their flat valve seats. See Figs. 6 and 7.

A guard member 58 is shown around the manual lever 42—42', attached at its upper end to the body, as at 59, with an opening 58' therein, and at its lower end attached, as at 60, said guard member 58 having in its bottom a latch lug or portion, designated 61, behind which the lower end of said operating lever can be moved to hold it in open position.

The lower end of said valve body, particularly the entrance chamber 14, is provided with means for connecting a pipe or hose, as at 62 from a source of supply of the fluid or gases under pressure to be used with the invention. The upper end of said body 12 is also internally threaded to have attached thereto a pipe or coupling member 63 for connecting said device with the closed receptacle or reservoir (not shown) which is to receive said fluids or gases under pressure.

This invention is particularly well adapted for handling liquified petroleum gases, such as butane, propane, or combinations thereof, from a source of supply to a tank, or reservoir, from which it is to be used.

The valve is connected to said tank (not shown), so as to prevent leakage therefrom, and to the source of supply, as with the pipe or hose 62. The parts of the valve are then in the positions shown in Figs. 2 and 5. The first operation is to push the push valve head 48 inwardly to move its valve member 46 inwardly into engagement with the valve seat 46', and at the same time engage the rod 51 so as to move the valve 50 off its seat 50', to the positions shown in Fig. 4. In this position, it will be seen that fluid under pressure will enter the port 44 from the entrance chamber 14 and around said hexagonal valve 50, and up through the port 55 and into the exit chamber 13, until the pressure in said exit chamber 13 and the receiving tank is built up to equal that in the entrance chamber 14. The pressure in said entrance chamber and said exit chamber, on opposite sides of the main valve 17 is thus equalized. This pressure has also compressed the metallic bellows 26, thereby moving the rod 24 and its hexagonal end 23 inwardly in the screw plug 20, and, through the arm 30, has turned the valve moving member 35 to the position shown in Fig. 4, and also in Fig. 3. The mechanism is now set for manual operation to open the main valve 17 and let the fluid or gas flow freely through the exit chamber 13 and into the receiving tank or reservoir. Because the pressure has first been equalized in entrance chamber 14 and exit chamber 13, on opposite sides of said main valve 17, it is a simple thing then to move said main valve 17 against the tension of spring 19 into open position by operating the hand lever 42, and through the member 35, as shown in Fig. 4, move said main valve to open position, as shown in Fig. 3. This simple method of balancing the pressure on opposite sides of the main valve 17, eliminates the need for dash-pot or similar devices.

Until this pressure equalization has been accomplished in the manner just described, said valve moving member 35, for moving the main valve 17, is in the position shown in Figs. 2 and 5, and no matter if the hand lever 42' be moved, it will be without effect.

It will be understood, of course, that the hand pushed valve 50, and the valve 46, will be returned to normal positions, as seen in Fig. 3, without changing the positions of the main valve moving members 35, 30 and 24, or closing said main valve 17.

If, for example, something should happen to the outlet connection during the time the main valve is open, the pressure drop in the exit chamber 13, would permit the spring 28 in said bellows 26 to expand and move the valve-pressing member 35 out of engagement with said main valve, and thus permit said main valve to be closed by its spring and the pressure in the entrance chamber 14, even though the operating hand lever 42 be held in the otherwise operating position.

When it is desired to shut off the flow of the fluid through the mechanism, the hand lever 42' is released and the main valve is closed by the spring 19, the slide member 35 moving therewith and with the release movement of said handle. There will still be pressure in said exit chamber 14 sufficient to keep the bellows 26 compressed, and to make it difficult to release or detach the connection to the receiving tank or reservoir. It will be understood, of course, that said receiving tank will have a check valve or other valve means for closing it to prevent escape of fluid therefrom. The pressure in the exit chamber 13 is released by pressing the head 48 and its valve 46 inwardly as seen in Fig. 5, which permits this pressure to be released through a vent outlet 56 and 57, shown in light dotted lines in said Fig. 5 and will also permit the bellows 26 to expand and move member 35 to position shown in Figs. 2 and 5. This valve 46 is movable for this purpose independently of valve 50, as will be clear from Figs. 2 and 5.

A further reason for venting the exit chamber before disconnecting the coupling 63 is to prevent the possible frosting of said coupling, for if the coupling were to be unscrewed while the full pressure of fluid was in the chamber 13, the rush and expansion of gas at the coupling point would reduce the temperature of the coupling to a point at which the hand of the attendant might suffer frostbite. Venting the exit chamber 13 in the manner shown at a point removed from the coupling eliminates this danger.

Thus I have provided a simple, practical and highly efficient valve mechanism for dispensing such fluids under pressure, under closed conditions, with a minimum of waste and with a minimum of danger; a valve mechanism in which the fluid pressure on opposite sides of the main control valve is equalized in a simple and practical way before the main control valve can be moved to open position; a mechanism in which said pressure must be equalized before the main control valve can be moved, even though the control hand lever is operated.

It is to be understood, of course, that where we have used the term "closed receptacle" to receive the transferred liquified gas, we have in mind any closed chamber, pipe, or other place to which the valve mechanism can be connected for transferring gas or fluid under pressure from one closed place to another closed place.

I am aware that many changes in the construction and arrangement of the mechanism here shown for explanatory purposes can be made without departing from the real spirit of the invention, and I do not, therefore, limit the invention to the showing here made for patent purposes, except as I may be limited by the hereto appended claims.

I claim:

1. In a valve mechanism having a body provided with means for connecting it with a source of fluid under pressure, and with means for connecting it with a closed receptacle to receive said fluid under pressure therefrom, of a valve seat with a movable valve thereon dividing the interior of said body into a receiving chamber and an exit chamber, said valve member being held closed by the fluid pressure in said receiving chamber, a by-pass channel extending from one chamber to the other, a valve in said channel, devices associated with said bypass valve constructed and arranged to permit the opening thereof with resultant equalization of pressure in said chambers, normally ineffective means for opening said first-named valve disposed in said exit chamber, pressure responsive means in said exit chamber connected to said valve opening means and operable in the presence of pressure in said exit chamber to render said valve opening means effective to open said first named valve and manually operable means extending from the exterior of said body into the said exit chamber operable when said valve opening means is rendered effective to open said first named valve.

2. In a valve mechanism having a body provided with means for connecting it with a source of fluid under pressure, and with means for connecting it with a closed receptacle to receive said fluid under pressure therefrom, of a valve seat with a movable valve thereon dividing the interior of said body into a receiving chamber and an exit chamber, said valve member being held closed by fluid pressure in said receiving chamber, means operable after connection of said valve mechanism with said closed receptacle to effect equalization of the pressure in said chambers, and devices rendered effective only upon said equalization of pressure constructed and arranged to permit said valve to be opened when said member is in a valve operating position.

3. In a valve mechanism having a body provided with means for connecting it with a source of fluid under pressure, and with means for connecting it with a closed receptacle to receive fluid under pressure therefrom: of a valve seat and valve member thereon dividing the interior of said body into a receiving chamber and an exit chamber, a spring normally tending to move said valve member to closed position, a member in said exit chamber movable into an operating position to engage said valve member for moving it off its valve seat to open position, fluid pressure responsive means effective to move said member into and out of operating position, and a manually operable lever having means disposed to engage and move said member and said valve member to open communication between said entrance and exit chambers.

4. In a valve mechanism having a body provided with means for connecting it with a source of fluid under pressure, and with means for connecting it with a closed receptacle to receive fluid under pressure therefrom: of a valve seat and valve member thereon dividing the interior of said body into a receiving chamber and an exit chamber, the fluid pressure in said receiving chamber normally holding said valve member closed, a member in said exit chamber movable into an operating position to engage said valve member for moving it off its valve seat to open position, means actuated by fluid pressure in said exit chamber to move said valve operating member into operating position, spring means normally tending to move said member out of operating position, and an operating lever manually operable to move said valve member to open communication between said entrance and exit chambers.

5. In a valve body having a receiving chamber and an exit chamber, means connecting said receiving chamber with a source of fluid under pressure, means adapted to connect said exit chamber with a closed receptacle, a valve controlled opening in said body disposed between said receiving chamber and said exit chamber, a valve engageable with said opening, said valve being held closed by fluid pressure in said receiving chamber, a normally closed by-pass extending from said receiving chamber to said exit chamber with means for opening the same, whereby to equalize fluid pressure in said chambers, a member in said exit chamber movable into an operating position to engage said valve member for moving it off its valve seat to open position, means for moving said valve operating member into and out of operating position, said means being operable by increased pressure in said exit chamber, and an operating lever manually operable to move said valve operating member and said valve member to open communication between said chambers in said body.

6. A valve mechanism for liquid petroleum gases and the like, including a body with a receiving chamber and an exit chamber therein, and a valve-controlled opening therebetween, said valve being normally closed with fluid pressure in said receiving chamber, a spring also normally holding said valve closed, means forming a normally closed by-pass between said chambers adapted upon being opened to effect equalization of the fluid pressure therebetween, means for opening and closing said by-pass at will, valve operating means comprising, a valve operating member in said exit chamber movable from a normally occupied inoperative position into an operative position to engage said valve, means operable by increased pressure in said exit chamber constructed and arranged to move said valve operating member into said operating position, and a lever manually operable to engage and move said valve operating member and said valve to open communication between said receiving chamber and said exit chamber.

7. In a dispensing valve mechanism of the character referred to, a body having its interior divided into a receiving chamber and an exit chamber with a movable valve controlled opening therebetween, means forming a by-pass from said receiving chamber to said exit chamber independently of said valve, means for opening and closing said by-pass to equalize the fluid pressure on opposite sides of said valve, valve operating means effective to open said valve only when the fluid pressure is equalized comprising a valve moving member in said exit chamber movable to a valve engaging position, means operable by increased pressure in said exit chamber for moving said valve moving member into operable position, and a lever manually operable for engaging and moving said valve operating member and said valve to open position to open communication between said receiving and exit chambers.

8. A valve mechanism including a body having means for connecting it with a source of liquid gas under pressure and means for connecting it with a closed receptacle, a valve seat therein with valve member thereon dividing the interior of said body into a receiving chamber and an exit chamber, said valve member being held closed by the pressure in said receiving chamber, means providing a closed by-pass from said receiving chamber to said exit chamber apart from said valve, said means being operable to open and close said by-pass, valve operating means comprising a valve moving member in said exit chamber movable into and out of operating position relative to said valve member, means operated by increased pressure in said exit chamber for adjusting said valve moving member into operating position, whereby said valve moving member is automatically put into operating position by the increased pressure in said exit chamber, a hand lever for moving said valve moving member and said valve to open position to deliver gas under pressure to said closed receptacle, and means for relieving the pressure in said exit chamber with incident disabling of said valve operating means.

9. In a dispensing valve mechanism, a body having means for connecting it with a source of liquid gas under pressure and means for connecting it with a closed receptacle, a valve seat with valve member thereon dividing the interior of said body into a receiving chamber and an exit chamber, said valve member being held normally closed by pressure in said receiving chamber and by a coiled spring bearing thereon, means providing a closed by-pass from said receiving chamber to said exit chamber, with means for manually opening the same to equalize the pressure on both sides of said valve member, a valve moving member movable into and out of position to engage said valve member for opening the same, a compression bellows in said exit chamber connected with said valve moving member for moving it into operating position with increased pressure in said exit chamber, and a hand lever manually operable to engage and move said valve moving member and said valve member to open position to permit flow of gas under pressure through said valve body to said closed receptacle.

10. In a valve mechanism having a body provided with means for connecting it with a source of fluid under pressure, and with means for connecting it with a closed receptacle to receive said fluid under pressure therefrom, of a valve seat with a movable valve thereon dividing the interior of said body into a receiving chamber and an exit chamber, said valve member being held closed by the fluid pressure in said receiving chamber, a spring normally tending to move said valve member to closed position, manually operable means for moving said valve away from said valve seat, means forming a closed by-pass for fluid pressure from one chamber to the other to equalize the fluid pressure in said body on opposite sides of said valve member, means for manually opening said by-pass, and a manually operable valve means associated with said by-pass constructed and arranged to effect selectively the equalization of pressure in said chambers or reduction of pressure in said exit chamber.

RAYMOND J. KIRKBY.

REFERENCES CITED

The following references are of record in the file of this patent:

UNITED STATES PATENTS

| Number | Name | Date |
|---|---|---|
| 635,127 | Cummings | Oct. 17, 1899 |
| 795,053 | McGonagle | July 18, 1905 |
| 803,189 | Palmer | Oct. 31, 1905 |
| 1,122,397 | Hamilton | Apr. 10, 1917 |
| 1,725,826 | Payne | Aug. 27, 1929 |
| 1,890,847 | Flory | Dec. 13, 1932 |